Oct. 4, 1938.   J. L. SLATINSKY   2,132,223
TWO-CYCLE SUPERCHARGED INTERNAL COMBUSTION ENGINE
Original Filed April 30, 1936   2 Sheets-Sheet 1

INVENTOR.
Joe Louis Slatinsky
BY Chappell, Earl T Chappell
ATTORNEYS

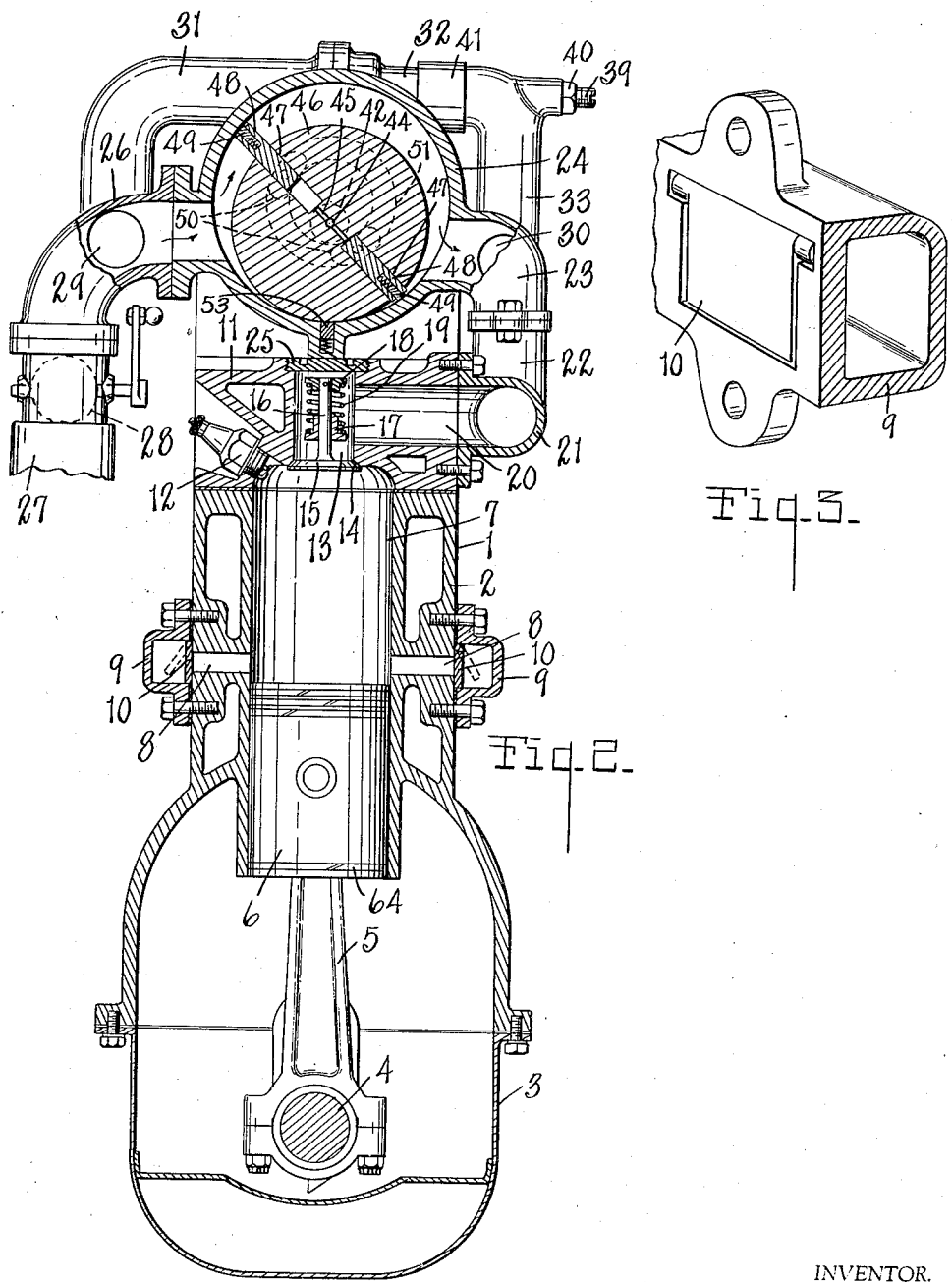

Patented Oct. 4, 1938

2,132,223

UNITED STATES PATENT OFFICE 2,132,223

TWO-CYCLE SUPERCHARGED INTERNAL COMBUSTION ENGINE

Joe Louis Slatinsky, Mattawan, Mich.

Application April 30, 1936, Serial No. 77,154
Renewed March 4, 1938

15 Claims. (Cl. 123—65)

The main objects of this invention are:

First, to provide a two-cycle internal combustion engine and a supercharger therefor adapted to supply a definite volume of combustion mixture to the cylinders.

Second, to provide an engine of the type described, having overhead valves concealed in the head which are operated by the flow of gas mixture to the cylinder.

Third, to provide an engine of the type described, in which the necessity for a valve actuating cam shaft is eliminated.

Fourth, to provide a supercharger for a two-cycle internal combustion engine, which is adapted to supply a definite amount of hydrocarbon mixture for every intake stroke of the piston thereof.

Fifth, to provide an engine and supercharger which are characterized by their efficiency and economy.

Objects relating to details and economies of the invention will appear from the description to follow. The invention is defined in the claims.

A preferred embodiment of the invention is illustrated in the accompanying drawings, wherein:

Fig. 2 is a view in transverse section through the engine and supercharger.

Fig. 3 is an enlarged fragmentary perspective view illustrating the construction of the exhaust manifold and the valve associated with the exhaust port of the engine.

Figure 1:
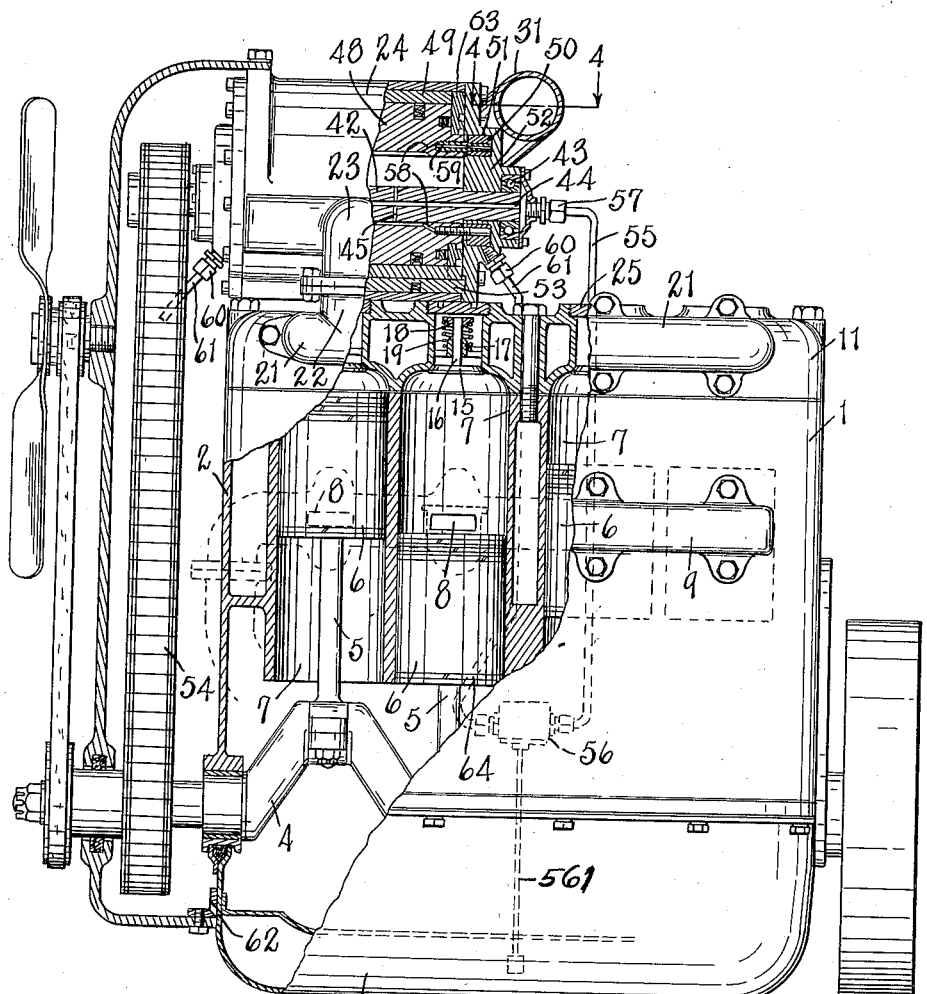
Fig. 1 is a side view of an engine of the two-cycle internal combustion type, equipped with a supercharger as embodied in my invention, parts being broken away and parts sectioned to more clearly illustrate the construction.

In the drawings, an engine of the two-cycle internal combustion type having a plurality of cylinders is generally indicated by the reference numeral 1 and consists of a conventional water cooled cylinder block 2 and crankcase 3 containing a crankshaft 4 and connecting rods 5. Pistons 6 are attached to the connecting rods and slide in cylinders 7. The cylinders of my engine are provided with radial exhaust ports 8, preferably two in number, spaced on opposite sides of the cylinder and communicating with exhaust manifolds 9 which are bolted to the cylinder block. Trunnioned to the exhaust manifold adjacent the exhaust cylinder port, I provide flap valves 10 adapted to swing outwardly upon the exhausting of burned gas through the ports, as illustrated in Fig. 2 in dotted lines. The valves mentioned function to prevent shock against the piston upon the firing of the other cylinders which constitute the engine, as illustrated in Fig. 1. The engine is shown as having four cylinders; however, it will be understood that a six-cylinder or eight-cylinder engine may be employed. The other cylinders and parts associated therewith are identical to those illustrated in Fig. 2.

A water jacketed cylinder head 11 is associated with the cylinder block 2 and carries the ignition means in the form of a conventional spark plug 12. The head is provided with a valve chamber 13 terminating in a circular valve seat 14 against which a pressure controlled poppet or disk valve 15 is adapted to seat. The stem 16 of the valve 15 extends upwardly, sliding in a guide 17 rigidly secured in the valve chamber and has pinned thereto at its upper end a stop 18. A relatively soft coil spring 19 surrounds the stem between the stop 18 and guide 17 and serves to normally maintain the valve against its seat. The valves are rendered accessible by the externally threaded plates 25 which, by means of a spanner wrench, are screwed into the cylinder head above the valve chambers 13 to close the same.

The head 11 has formed therein an intake passage 20 which communicates with an intake manifold 21 bolted to the side of the cylinder head and the manifold has an upwardly extending conduit 22 which is bolted to the discharge conduit 23 of the supercharger cylinder 24.

Figure 4:
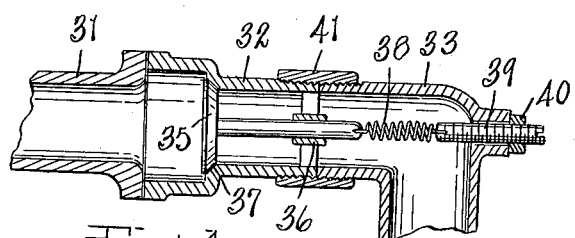
Fig. 4 is a fragmentary enlarged view in section on a line corresponding to line 4—4 of Fig. 1, illustrating the construction of the by-pass conduit of the invention.

The discharge conduit 23 communicates with the right or discharge side of the cylinder 24, as viewed in Fig. 2, and the left or intake side of the cylinder 24 is in communication with a supply conduit 26 which is in turn connected to a further carburetor conduit 27 having a butterfly throttle valve 28 therein. The supply and discharge conduits 26, 23 are provided with openings 29, 30, respectively, which communicate with a by-pass system comprising conduits 31, 32, 33, the arrangement of which is clearly illustrated in Fig. 4. A spring restrained disk valve 35 is slidably mounted in a guide 36 formed in the conduit section 32 and is adapted to normally close against a valve seat 37 under the action of the spring 38 extending between the stem of the valve and a set screw 39 threaded in conduit section 33. A lock nut 40 is provided to lock the set screw in adjusted position. The conduit sections 32 and 33 are secured together by a sleeve 41 into which the sections are threaded. The sections 31 and 32 are suitably secured together as by bolts. The spring 38 is of more strength or tension than the intake valve spring 19 for a purpose which will be hereinafter described.

A shaft 42 is rotatably and eccentrically mounted in the pump cylinder 24 on bearings 43 and has a lubricant passage 44 extending axially thereof as well as a plurality of radial lubricant passages 45. An impeller member 46 is suitably mounted on the shaft 42 to rotate therewith and the impeller member has radial slots or grooves 47 therein which communicate with the lubricant passages 44.

Each of the slots 47 has an impeller blade 48 slidable radially therein and provided with a spring pressed sealing member 49 of leather, composition or other suitable material, which is adapted to wipe against the internal peripheral wall of the pump cylinder 24. The blades 48 each carry a pivotally mounted cam follower or slide 50 which is adapted to travel in a cam track 51 formed in the end walls 52 of the pump cylinder and concentric with the cylinder. Thus, it will be seen that the shaft 42 being eccentric of the cylinder, and the cam track 51 being concentric of the cylinder, upon rotation of the impeller member 45, the blades 48 will be caused to slide radially in slots 47 under the guidance of the followers 50 in the tracks 51. The eccentricity is so arranged that the spring pressed sealing or wiping members 49 will maintain a constant and uniform pressure against the cylinder. In passing the intake opening of the cylinder, each blade measures a definite quantity of combustion mixture supplied thereto and positively transports it in the direction indicated by arrows in Fig. 1, from the intake opening to the discharge opening on the opposite side of the cylinder, the charge of mixture being contained in the space between the impelling blade and the preceding blade. A spring pressed packing or sealing strip 53 prevents passage of the fuel or combustion mixture through the cylinder in any other than the intended manner.

The shaft 42 of my impeller is positively driven by means of a chain 54 connecting the same to the crankshaft, and the impeller is timed to make two rotations for each rotation of the crankshaft. The blades 48 are retarded 45° in relation to the crankshaft and are operative to force a charge of the combustion mixture into the engine cylinder at the time when the piston is going down. As illustrated in Fig. 1, the impeller device is adapted to supply combustion mixture to two cylinders of the four-cylinder engine embodied therein.

It will be understood that the pistons of the engine cylinders must be at dead center, either top or bottom, before the blades of the supercharger are retarded 45°. The purpose of so retarding the supercharger blades is to prevent the building up of unnecessarily high pressures in the supercharger. The spring 19 is soft or yielding enough to permit the pressure of the fuel mixture supplied from the supercharger to open the valve 15 readily at the time when the piston is going down. It will be appreciated that upon the down stroke of the piston the supercharger is forcing a charge of mixture into the piston cylinder and the piston is drawing the same down. The necessity of a cam shaft for the purpose of actuating the intake valve is thus eliminated.

The intake valves, being concealed in the dome of the cylinder head, effectively prevent the escape of gas mixture.

The by-pass formed by the conduit sections 31, 32, and 33, together with the valve elements associated therewith, allows the combustion mixture to be recirculated inasmuch as the spring 38 is of less tension than the spring 19. Thus, the combustion mixture not taken in the cylinder 7 is recirculated to the supply side of the supercharger. The force with which the valve 35 is retained against its seat is adjustable by means of the set screw 39, and accordingly the supercharger may be throttled at will.

My invention comprises improved means for lubricating the supercharger pump elements, which consists of a lubricant pipe or tube 55 communicating between the discharge side of a suitable oil pump 56. The pump communicates with a supply of oil in the crank case through an intake tube 561 in a well known manner and discharges into tube 55 and a fitting 57 secured in alinement with the hollow shaft 42, whereby lubricant is forced axially through the passage 44 and radially through the passages 45 into the slots 47. A free sliding movement of the impeller blades 48 is thus assured. Each blade is provided with passages 58 communicating with a passage 59 formed in the follower 50 associated with the blade, and the passage 59 extends axially entirely through the follower so that lubricant is forced into the cam track 51. A lubricant fitting 60 is threaded into the end wall of the cylinder 24 and communicates with the cam track at the lower side thereof, whereby oil may drain out through a discharge tube 61 and passage 62 leading to the oil sump of the crankcase. Similar provisions for oil circulation are made at both sides of the cylinder as viewed in Fig. 1, inasmuch as cam tracks and followers are provided at both sides thereof. Spring pressed side sealing members 63 serve to prevent undue circulation of lubricant beyond the slots 47 into the cylinder.

It is believed that the description of the lubrication system does not require further amplification. A free supply of lubricant to all parts of the supercharger impeller is afforded and the flow of lubricant is substantially frictionless.

By my construction, the supercharging of a four-cylinder engine with a definite volume of fuel is made possible by means of a two-blade supercharger. The principles of my invention may be applied in supercharging a six-cylinder engine by the use of a three-blade supercharger and an eight-cylinder engine by the use of a four-blade supercharger, etc. My by-pass arrangement provides convenient and accurate control for the air and vacuum according to the pressure requirements of the engine and may be readily adjusted and locked in adjusted position.

I preferably employ a piston in my engine which is slightly longer than the stroke, for the purpose of allowing the insertion of a sealing ring 64 at the bottom thereof to prevent the escape of exhaust gases into the crankcase and the pumping of oil into the exhaust manifold 9. Thus, for example, for an engine having a four-inch stroke, I prefer to employ a piston approximately one-fourth of an inch longer than the stroke.

From the above description, the operation of my device is apparent. The blades 48 of the impeller alternate in discharging fuel mixture into the cylinders associated with the supercharger, being retarded 45° with respect to the stroke. Gasoline mixture is propelled into the cylinder on the down stroke of the piston, the intake valves 15 being opened by the combined action of the piston in drawing the fuel mixture down and the supercharger in forcing it down at the same time. The choice of a soft spring for the intake valves makes this possible and eliminates the need for a cam shaft and associated mechanisms.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In combination, a multi-cylinder two-cycle engine, supercharger, means for measuring and supplying a definite volume of combustion mixture to the cylinders at each cycle thereof, comprising a circular impeller cylinder mounted on said engine, an impeller mounted eccentrically in said supercharger cylinder for rotation therein and having radially slidable impeller blades, said cylinder having cam tracks in its end walls, followers carried by said blades and lying in said track, whereby said blades are maintained in wiping contact with said cylinder during their rotation, means driving said impeller in timed relation to the crankshaft of said engine, said impeller blades being retarded approximately 45° relative to said crankshaft, means supplying a combustion mixture to said supercharger cylinder, discharge means connecting said supercharger cylinder with the intake manifold of said engine, a spring seated valve between said manifold and the engine cylinder, yieldable solely under the pressure of the mixture on the down stroke of the piston, and a by-pass conduit joining said discharge means with said supply means and having a valve therein whereby combustion mixture not fed to the combustion chamber may be returned to the supply means.

2. In combination, a multi-cylinder two-cycle engine, supercharger, means for measuring and supplying a definite volume of combustion mixture to the cylinders at each cycle thereof, comprising an impeller cylinder mounted on said engine, an impeller mounted in said supercharger cylinder for rotation therein and having radially slidable impeller blades, said cylinder having cam tracks in its end walls, followers carried by said blades and lying in said track, whereby said blades are maintained in wiping contact with said cylinder during their rotation, means driving said impeller in timed relation to the crankshaft of said engine, said impeller blades being retarded approximately 45° relative to said crankshaft, means supplying a combustion mixture to said supercharger cylinder, discharge means connecting said supercharger cylinder with the intake manifold of said engine, a spring seated valve between said manifold and the engine cylinder, yieldable solely under the pressure of the mixture on the down stroke of the piston, and a by-pass conduit joining said discharge means with said supply means and having a valve therein whereby combustion mixture not fed to the combustion chamber may be returned to the supply means.

3. In combination, a multi-cylinder two-cycle engine, supercharger, means for measuring and supplying a definite volume of combustion mixture to the cylinder of said engine at each cycle thereof, comprising an impeller cylinder mounted on said engine, an impeller mounted in said supercharger cylinder for rotation therein and having vanes adapted to measure and transport a definite quantity of combustion mixture, means driving said impeller in timed relation to the crankshaft of said engine, means supplying a combustion mixture to said supercharger cylinder, discharge means connecting said supercharger cylinder with the intake manifold of said engine, a spring seated valve between said manifold and the engine cylinder, yieldable solely under the pressure of the mixture on the down stroke of the piston, and a by-pass conduit joining said discharge means with said supply means and having a valve therein whereby combustion mixture not fed to the combustion chamber may be returned to the supply means.

4. In combination, a two-cycle engine, and supercharger, means for measuring and supplying a definite charge of combustion mixture to the cylinder of said engine at each cycle thereof, comprising an impeller having radial measuring and impelling vanes, a cylinder in which said impeller is rotatably mounted, means for driving said impeller in timed relation to the crankshaft of the engine, means supplying a combustion mixture to said cylinder, discharge means connecting said cylinder with the intake manifold of said engine, and a spring seated valve between said manifold and the engine cylinder, actuated by the combustion mixture on the down stroke of the piston to admit mixture to the cylinder.

5. In a supercharger for a two-cycle internal combustion engine, a rotary pump cylinder mounted on said engine, an impeller shaft mounted eccentrically in said pump cylinder, an impeller mounted for rotation with said shaft and having radial slots, blades slidable in said slots and rotatable with said impeller and adapted to wipe against said pump cylinder during their rotation, said blades having spring pressed packing members at their outer edges, a cam track in the cylinder, cam followers on said blades traveling in said track to maintain the contact of the blades with said cylinder, and means for lubricating said supercharger, comprising an oil pump communicating with the engine crankcase, a conduit connecting said pump to said cylinder adjacent the shaft, said shaft having an axial lubricant passage and radial passages communicating said axial passage with said slots, said blades and followers having lubricant passages therein whereby the blades, cams and followers are lubricated, and means for returning lubricant from the cylinder to the crankcase.

6. In a supercharger for a two-cycle internal combustion engine, a rotary pump cylinder mounted on said engine, an impeller mounted for rotation in said cylinder and having radial slots, blades slidable in said slots and rotatable with said impeller and adapted to wipe against said pump cylinder during their rotation, a cam track in the cylinder, cam followers on said blades traveling in said track to maintain the contact of the blades with said cylinder, and means for lubricating said supercharger, comprising an oil pump communicating with the engine crankcase, a conduit connecting said pump to said cylinder adjacent the shaft, said shaft having an axial lubricant passage and radial passages communicating said axial passage with said slots, said blades and followers having lubricant passages therein whereby the blades, cams and followers are lubricated, and means for returning lubricant from the cylinder to the crankcase.

7. In a supercharger for a two-cycle internal combustion engine, a rotary pump cylinder mounted on said engine, an impeller shaft mounted in said cylinder, an impeller mounted for rotation with said shaft, blades carried by said impeller and adapted to wipe against said cylinder, a cam track, cam followers on said blades traveling in said track to maintain contact of the blades with said cylinder, and means for lubricating said supercharger, comprising an oil pump associated with the engine crankcase, a conduit connecting said pump to said cylinder adjacent the shaft, and means for returning lubricant from the cylinder to the crankcase.

8. In combinatoin, an engine cylinder having a valve chamber, a poppet valve seating therein, a coil spring urging said valve against its seat, an intake manifold opening to said chamber, a pump cylinder, rotary means in said pump cylinder for measuring and impelling a definite charge of combustion mixture to said manifold, means supplying the mixture to said pump cylinder, and means returning mixture from said pump cylinder to said supply connection when said valve is operative to prevent its entry to the cylinder, comprising a conduit by-passing said pump cylinder and connecting said manifold and said supply means, a valve in said conduit, a spring acting to close said valve against the flow of said mixture, said last named spring being weaker than said first named spring, said first named spring being actuated solely by pressure of the combustion mixture to admit mixture to the cylinder on the down stroke of the engine piston, and means for adjusting the tension of said last named spring.

9. In combination, an engine cylinder having a valve chamber, a poppet valve seating therein, a spring urging said valve against its seat, an intake manifold opening to said chamber, a pump cylinder, rotary means in said pump cylinder for measuring and impelling a definite charge of combustion mixture to said manifold, means supplying the mixture to said pump cylinder, and means for returning mixture from said pump cylinder to said supply connection when said valve is operative to prevent its entry to the cylinder, comprising a conduit by-passing said pump cylinder and connecting said manifold and said supply means, a valve in said conduit, and a spring acting to close said valve against the flow of said mixture, said last named spring being weaker than said first named spring, said first named spring being actuated solely by pressure of the combustion mixture to admit mixture to the cylinder on the down stroke of the engine piston.

10. In combination, an engine cylinder having a valve chamber, a poppet valve seating therein and actuated by pressure of combustion mixture thereagainst, a relatively soft spring retracting said valve against its seat, an intake manifold opening to said chamber, a pump cylinder, rotary means in said pump cylinder having radial vanes for impelling a definite charge of combustion mixture to said manifold, means supplying a mixture to said pump cylinder, and means for returning mixture from said pump cylinder to said supply when said vave is operative to prevent its entry to the cylinder, comprising a conduit by-passing said housing and connecting said manifold and said supply means.

11. In a two-cycle internal combustion engine, a cylinder having radial exhaust ports and an axial intake port, flap valves associated with said exhaust ports, and a poppet valve associated with said intake port adapted to be actuated by the pressure of combustion mixture therein, a spring normally actuating said intake valve to close said intake port against said pressure, a piston reciprocable in said cylinder and a crankshaft actuating the piston, an intake manifold, a supercharger connected to said manifold by a discharge conduit and comprising a circular pump cylinder, a shaft mounted eccentrically therein, a rotatable impeller on said shaft having radial slots, impeller blades slidable in said slots, said blades being retarded approximately 45° relative to said crankshaft, a cam track concentric with said pump cylinder, and followers carried by said blades in said track for maintaining the blades in contact with the inner periphery of said pump cylinder, means connected to said pump cylinder for supplying combustion mixture thereto, and means for by-passing said mixture from said discharge conduit back to said supply means when said intake valve is held in closed position, comprising a by-pass conduit having a spring pressed valve therein.

12. In a two-cycle internal combustion engine, a cylinder having radial exhaust ports and an axial intake port, flap valves associated with said exhaust ports, and a poppet valve associated with said intake port adapted to be actuated by the pressure of combustion mixture therein, a spring normally actuating said intake valve to close said intake port against said pressure, an intake manifold, a supercharger connected to said manifold by a discharge conduit and comprising a circular pump cylinder, a shaft mounted eccentrically therein, a rotatable impeller on said shaft having radial slots, impeller blades slidable in said slots, a cam track concentric with said pump cylinder, and followers carried by said blades in said track for maintaining the blades in contact with the inner periphery of said pump cylinder, means connected to said pump cylinder for supplying combustion mixture thereto, and means for by-passing said mixture from said discharge conduit back to said supply means when said intake valve is held in closed position, comprising a by-pass conduit having a spring pressed valve therein.

13. In a two-cycle internal combustion engine, a cylinder having radial exhaust ports and an axial intake port, a poppet valve associated with said intake port adapted to be actuated by the pressure of combustion mixture therein, a spring normally actuating said intake valve to close said intake port against said pressure, an intake manifold, a supercharger connected to said manifold by a discharge conduit and comprising a circular pump cylinder, a shaft mounted eccentrically therein, a rotatable impeller on said shaft having radial slots, impeller blades slidable in said slots, a cam track concentric with said pump cylinder, and followers carried by said blades in said track for maintaining the blades in contact with the inner periphery of said pump cylinder, means connected to said pump cylinder for supplying combustion mixture thereto, and means for by-passing said mixture from said discharge conduit back to said supply means when said intake valve is held in closed position, comprising a by-pass conduit having a spring pressed valve therein.

14. In a two-cycle internal combustion engine, a cylinder having radial exhaust ports and an axial intake port, a poppet valve associated with said intake port adapted to be actuated by the pressure of combustion mixture therein, a spring normally actuating said intake valve to close said intake port against said pressure, an intake manifold, a supercharger connected to said manifold by a discharge conduit and comprising a pump cylinder, a rotatable impeller in said pump cylinder having radial measuring and impelling vanes, means connected to said pump cylinder for supplying combustion mixture thereto, and means for by-passing said mixture from said discharge conduit back to said supply means when said intake valve is held in closed position, comprising a by-pass conduit having a spring pressed valve therein.

15. In a two-cycle internal combustion engine, a cylinder having radial exhaust ports and an axial intake port, a poppet valve associated with said intake port adapted to be actuated by the pressure of combustion mixture therein, a spring normally actuating said intake valve to close said intake port against said pressure, an intake manifold, a supercharger connected to said manifold by a discharge conduit and comprising a pump cylinder, a rotatable impeller in said pump cylinder having radial measuring and impelling vanes, means connected to said pump cylinder for supplying combustion mixture thereto, and means for by-passing said mixture from said discharge conduit back to said supply means when said intake valve is held in closed position.

JOE LOUIS SLATINSKY.